G. D. HAYDEN.
MACHINE TOOL.
APPLICATION FILED APR. 14, 1915.
1,173,573.
Patented Feb. 29, 1916.
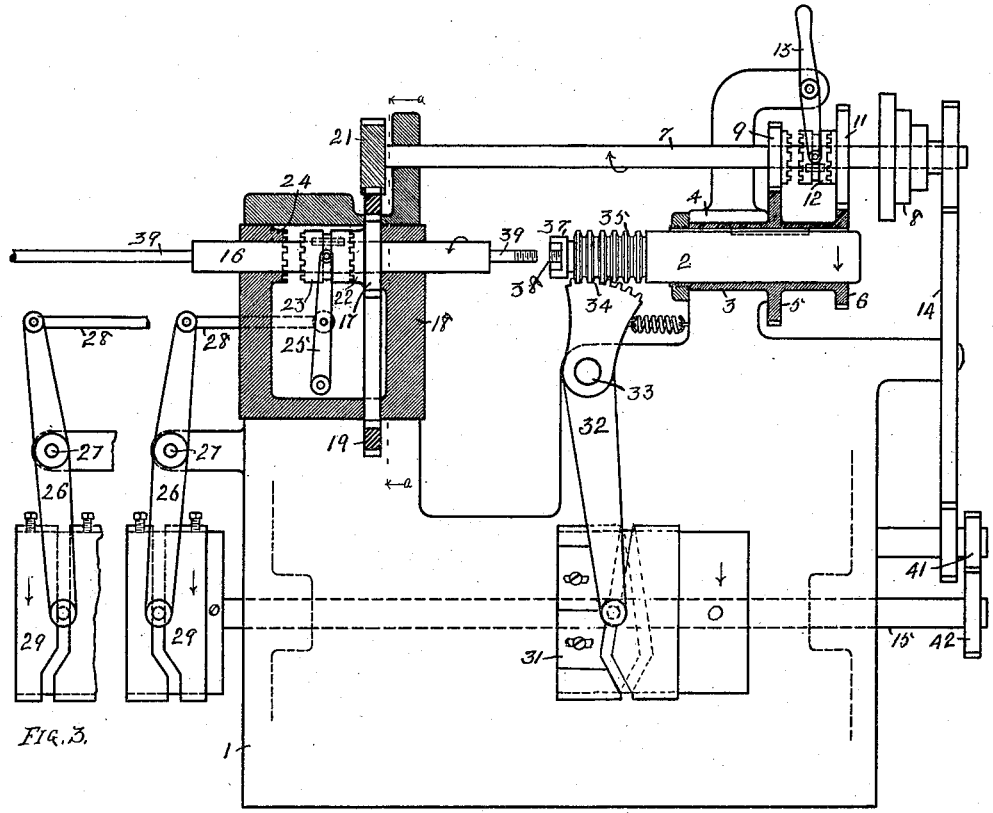
FIG. 1.
FIG. 3.
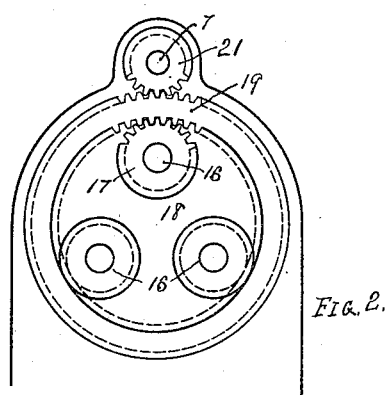
FIG. 2.
Witnesses
H. G. Blyland
Chas. G. Johannesmeyer
George D. Hayden, Inventor
By Robert S. Carr, Attorney
THE COLUMBIA PLANOGRAPH CO., WASHINGTON, D. C.

UNITED STATES PATENT OFFICE.

GEORGE D. HAYDEN, OF OAKLEY, OHIO.

MACHINE-TOOL.

1,173,573.  Specification of Letters Patent.  Patented Feb. 29, 1916.

Application filed April 14, 1915. Serial No. 21,443.

*To all whom it may concern:*

Be it known that I, GEORGE D. HAYDEN, a citizen of the United States, residing at Oakley, Hamilton county, Ohio, have invented a new and useful Improvement in Machine-Tools, of which the following is a specification.

My invention relates to machine tools of the class adapted to cutting screw threads or for other suitable purposes, and the objects of my improvements are to provide suitable mechanism for cutting screw threads by an improved method, whereby either internal or external threads may be cut at a suitable slow speed for prolonging the life of the threading tools and without sacrificing time in subjecting the speed of the other working tools of the machine to the slow speed of the threading mechanism; to provide a self contained machine with means for accomplishing a wider range of work than has heretofore been done; to provide mechanism capable of cutting right or left hand threads of different lengths and of coarse or fine pitch, and to provide simple and durable construction and assemblage of the various members for securing facility of operation, accuracy and efficiency of action. These objects may be attained in the following described manner, as illustrated in the accompanying drawings, in which:—

Figure 1 is a side elevation with parts in section of my improvements as applied to a multiple spindle automatic screw machine wherein all unnecessary parts are omitted, Fig. 2 a cross section on the line a—a of Fig. 1 showing the annular gear driving connections with the work spindles, and Fig. 3 an elevation of the drum cam in reversed position for use in cutting left hand threads.

In the drawings wherein are shown only the coacting members necessary for effecting the thread cutting operation, the omitted portions being of the ordinary construction and arrangement, 1 represents the base, 2 a tool spindle splined in a sleeve 3 which is journaled in a fixed bearing 4 and provided with gears 5 and 6 of different size. Shaft 7 journaled in fixed bearings is provided with a driven stepped pulley 8 whereby it may be driven at different speeds and with loose gears 9 and 11 in engagement with the respective gears on sleeve 3. A double clutch member 12 splined on shaft 7 may be moved and maintained, by means of the lever 13, into engagement with either of the adjacent clutch members formed on gears 9 and 11. A train of gears 14 serves to drive the shaft 15 from shaft 7 and the relative speeds of said shafts may be changed by replacing the gears 41 and 42 with others of different relative sizes in the ordinary manner.

A plurality of work spindles 16 each provided with a pinion 17 are carried by the rotatively adjustable head 18, which may be indexed in the ordinary manner (not shown). The annular gear 19 driven by the pinion 21 on shaft 7 serves to rotate the spindles simultaneously by engagement with the pinions thereon. One of the pinions 17 shown in Fig. 1 is free to turn on its corresponding spindle 16 and is formed with a clutch member 22. The double clutch member 23 splined on said spindle may be alternately engaged therewith and with the clutch member 24 formed on the head 18, by means of the shifting lever 25.

The lever 26 fulcrumed at 27 engages at one end by means of the link 28 with the shifting lever 25 and at the other end with the drum cam 29 which is removably secured on shaft 15 as shown in Fig. 1. An adjustable drum cam 31 of any ordinary construction is secured on shaft 15 and the lever 32 fulcrumed at 33 movably engages at one end therewith and the segmental rack 34 formed on the other end of said lever engages with the annular gear teeth 35 formed on the tool spindle 2. Said drum cam actuates the lever to move the spindle in a forward direction and also in the opposite direction. The adjustment of the drum cam 31 provides for changing the length of movement of the tool spindle to correspond with the length of the thread to be cut. Said spindle is provided with a holder or socket 37 whereby the die 38 may be carried to float in the usual manner for cutting the threads on the blank stock 39 which is movably secured within the spindle 16 as shown in Fig. 1.

In operation, the cone pulley with shaft 7 may be driven in the direction of the arrow at different predetermined speeds corresopnding to dicerent duties required of the cutting tools. The change of the speed of shaft 15 with the drum cams may be effected by the substitution of other relative sized gears for the gears 41 and 42 when threads of a different pitch are to be cut. The adjustable drum cam 31 provides for moving the tool spindle different longitudinal distances for cutting threads of correspondingly different lengths in the same predetermined period of time.

For cutting right hand threads, the clutch member 12 should be maintained in continuous engagement with gear 11 for driving the tool spindle at a predetermined and slower speed than that of the work spindle as for instance in the relative ratio of 3 to 4. The drum cam 29 with its connections serves to alternately engage the double clutch member 23 with the pinion 17 and with the fixed clutch member 24 for maintaining the work spindle alternately in and out of action during respective longer or shorter predetermined intervals of time. During the longer period of action of the work spindle the drum cam 31 with its connections serves to move the tool spindle at predetermined speed and distance in a forward direction for completing the cutting of the thread on the blank 39. The cutting of the thread is effected slowly in relation to the speed of the blank owing to the simultaneous rotation of the tool spindle at a less speed and in the same direction.

Upon the completion of the thread the lever 26 shifts automatically to the shorter stretch of the drum cam 29 for shifting the clutch member 23 into engagement with the member 24, for maintaining the work spindle out of action. During the inaction of the work spindle the shorter stretch on the drum cam 31 effects the quick return movement of the lever 32 with the work spindle for the automatic removal of the die from the screw.

For cutting left hand threads the clutch member 12 should be maintained in engagement with the gear 9 for driving the tool spindle in the same direction and at a slower speed than that of the work spindle, as for instance in the ratio of 1 to 4, and drum cam 29 should be secured on shaft 15 in a reversed position as shown in Fig. 3. The action of said drum cam with its connections now serves to maintain the work spindle in and out of action alternately during respective different shorter and longer periods of time. The slowly rotating tool spindle is now automatically advanced in the same manner as heretofore described but during the inaction instead of the action of the work spindle for cutting the thread on the blank. Upon the completion of the thread the work spindle is thrown into action by the drum cam 29 and its connections therewith and the continuous rotation of the tool spindle and its quick rearward movement permits the quick and automatic removal of the die. By substituting a suitable tap for the die the same described operations serve to cut internal threads.

Without attempting to set forth in detail the various constructions and arrangements in which the features of my invention may be embodied, what I claim and desire to secure by Letters Patent of the United States is:—

1. In a machine tool, the combination of a work spindle, a tool spindle, means for driving them at different relative speeds, a driven cam, mechanism including a clutch actuated thereby for maintaining the former spindle alternately in and out of action, a second driven cam, and mechanism actuated thereby for moving the latter spindle alternately in opposite longitudinal directions and simultaneously with the respective action or inaction of the former spindle.

2. A machine tool having in combination, a driven work spindle, a driven cam, clutch mechanism actuated thereby for positively maintaining said spindle in and out of action alternately during respective unequal intervals of time, a tool spindle driven at a different relative speed, and automatic mechanism for moving it alternately in opposite longitudinal directions and at respective different speeds and in intervals of time corresponding to the action and inaction of the former spindle.

3. A machine tool having in combination, two oppositely disposed spindles, means for driving them at respective different speeds and in the same direction, automatic mechanism for moving the one alternately in opposite longitudinal directions at respective different speeds, a driven cam, and mechanism including a clutch actuated thereby for maintaining the other spindle in and out of action during the respective said longitudinal movements.

4. A machine tool having in combination, a tool spindle, a work spindle movable into or out of alinement therewith and driven at a predetermined speed, a driven cam, clutch mechanism actuated thereby for maintaining work spindle alternately in or out of action during respective unequal periods of time, automatic mechanism for moving the former spindle alternately in respective opposite longitudinal directions during the action and inaction of the work spindle, and change speed connections for driving the tool spindle at predetermined different slower speeds than the speed of the work spindle.

5. A machine tool having in combination, a driven shaft, a cam shaft, change speed gear connections from the driven shaft therewith, two oppositely disposed spindles driven at different respective speeds from the driven shaft, a cam on the cam shaft with connections with one spindle for moving it alternately in opposite longitudinal directions during respective different intervals of time, and a cam on the cam shaft with connections arranged to maintain the other spindle alternately in or out of action during the respective longitudinal movements of the said other spindle.

6. A machine tool having in combination, a driven work spindle, a driven cam, clutch connections actuated thereby for maintaining said spindle in and out of action alternately during respective different predetermined intervals of time, a tool spindle in alinement with said work spindle and driven at a different speed and in the same direction, and cam actuated mechanism for moving the latter spindle toward and from the former spindle during its respective periods of inaction and action.

7. A machine tool having in combination, a work spindle driven at a predetermined speed, a driven cam, mechanism including a clutch actuated thereby for maintaining said spindle in or out of action alternately during respective different intervals of time, a tool spindle in alinement with the said spindle, and driven at a slower speed, and an adjustable cam with connections for moving the tool spindle different predetermined distances toward the work spindle during its periods of action, and means for moving the tool spindle in the opposite direction during the inaction of the work spindle.

8. In a machine tool, the combination of two driven cams, a driven tool spindle, a driven work spindle, a fixed clutch member, a clutch member driven at a different speed than the said tool spindle and in the same direction, mechanism actuated by one cam for alternately engaging the work spindle with the said clutch members, and mechanism actuated by the other cam for reciprocating the tool spindle longitudinally in timic relations therewith.

9. In a machine tool, the combination of two cams, means for driving them in unison, two spindles in axial alinement, a fixed and a driven clutch member, mechanism actuated by one cam for maintaining one spindle alternately in engagement with the respective clutch members, means for driving the other spindle in the same direction and at a different speed than the driven clutch member, and mechanism actuated by the said other cam for reciprocating the said latter spindle longitudinally in respective timic relations with the action or inaction of the said former spindle.

10. A machine tool having in combination, a cam shaft, change speed driven connections therewith, a spindle, a double clutch member splined thereon, a fixed and a driven clutch member, a cam on the shaft, and mechanism actuated thereby for moving and maintaining the double clutch member in alternate engagement with the coöperating fixed and driven clutch members during different predetermined intervals of time.

11. A machine tool having in combination, a cam shaft, change speed driven connections therewith, a spindle, change speed driven connections therewith, a cam on the shaft, mechanism actuated thereby for reciprocating the spindle longitudinally at respective different speeds, a fixed clutch member, a driven clutch member, a second spindle, a double clutch member splined thereon, mechanism for moving and maintaining said latter spindle in axial alinement with said former spindle, a second cam on the shaft, and mechanism actuated thereby for moving and maintaining the double clutch member in alternate engagement with the fixed and driven clutch members during the longitudinal movements of the former spindle in respective opposite directions.

12. A machine tool having in combination, two spindles in axial alinement, means for driving them at respective speeds and in the same direction, a driven shaft, two cams thereon, separate connections actuated by the respective cams for reciprocating one spindle longitudinally during unequal intervals of time and for maintaining the other spindle in and out of action during the movement of the former spindle in respective opposite directions.

13. In a multiple spindle automatic screw machine the combination of, a tool spindle, driven change speed connections therewith, automatic mechanism for reciprocating said spindle longitudinally, a rotatively adjustable head, a plurality of work spindles journaled therein and movable thereby successively into axial alinement with the tool spindle, driven connections with said work spindles, a driven cam, and clutch connections actuated thereby for maintaining the corresponding work spindle out of action during predetermined intervals of time corresponding to and simultaneously with the longitudinal movement of the tool spindle in one direction.

GEORGE D. HAYDEN.

Witnesses:
R. S. CARR,
CHAS. G. JOHANNESMEYER.

Copies of this patent may be obtained for five cents each, by addressing the "Commissioner of Patents, Washington, D. C."